Figure 3:
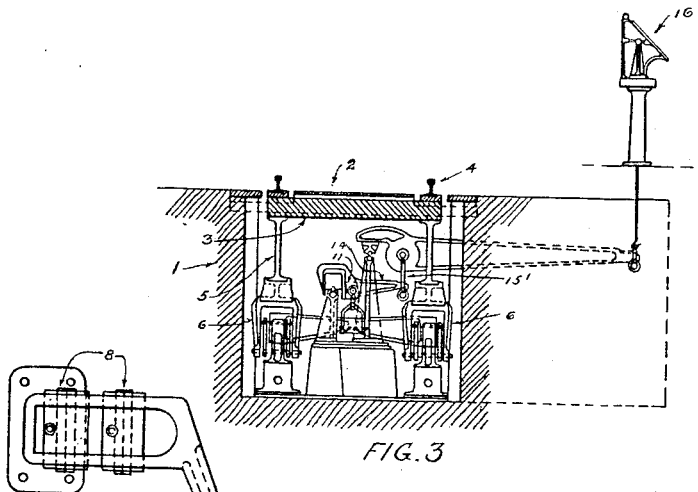

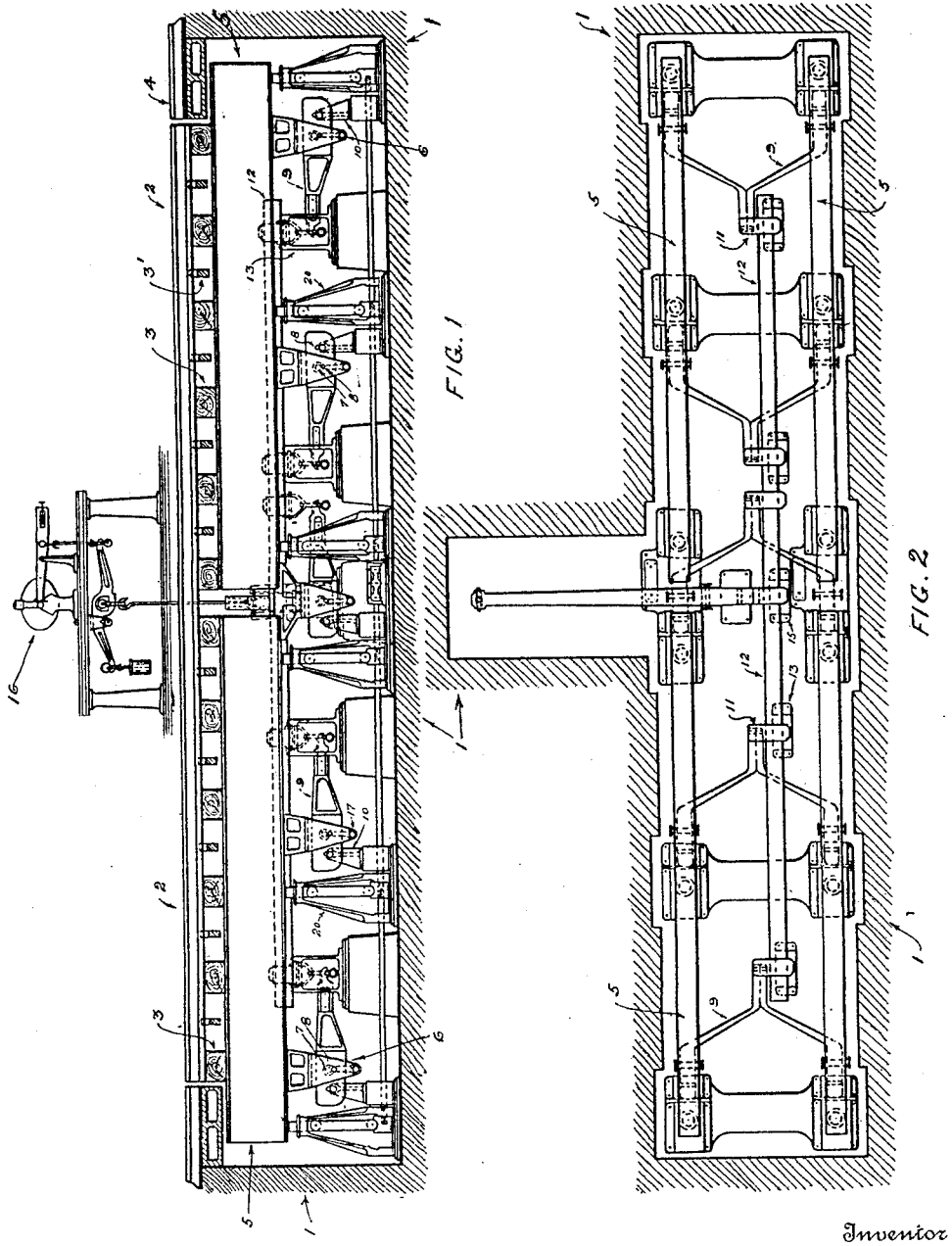

I. F. PFEIFFER.
SCALE.
APPLICATION FILED MAY 19, 1913.

1,210,689.

Patented Jan. 2, 1917.
6 SHEETS—SHEET 2.

Witnesses
Joseph Paul Burg
A. P. Connor

Inventor
Isadore Francis Pfeiffer

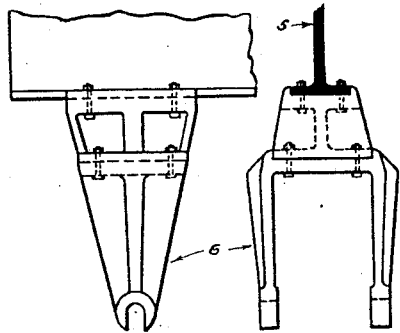
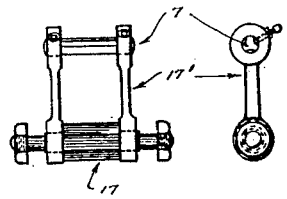
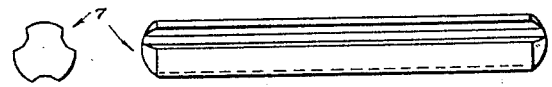
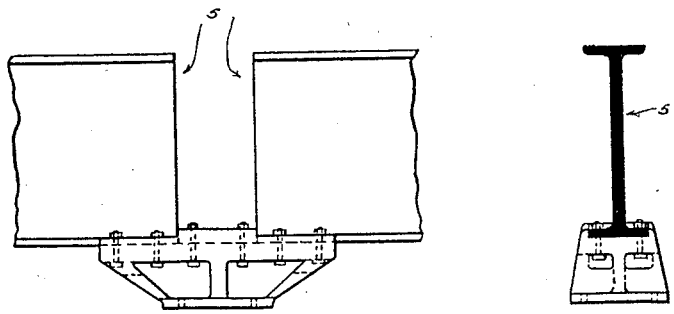

I. F. PFEIFFER.
SCALE.
APPLICATION FILED MAY 19, 1913.
1,210,689.
Patented Jan. 2, 1917.
6 SHEETS—SHEET 4.
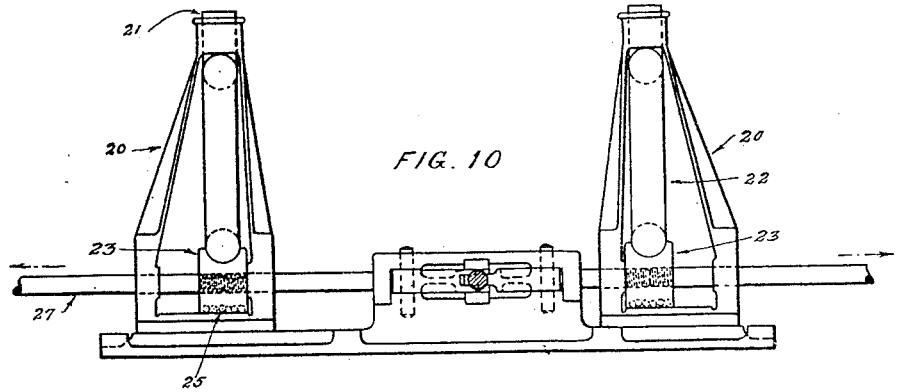
FIG. 10
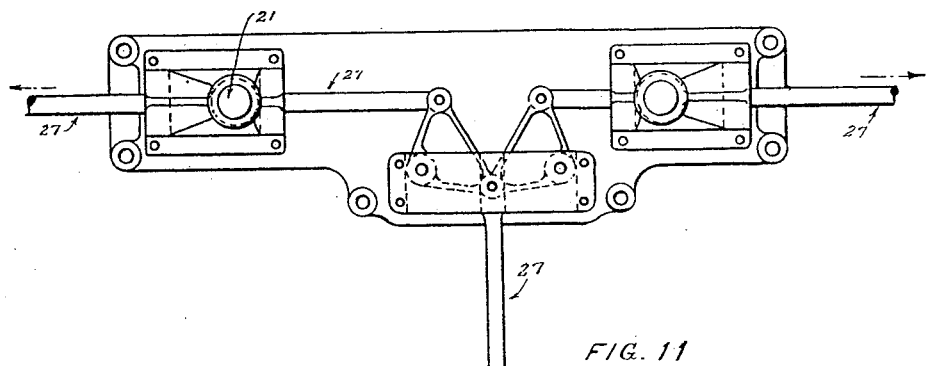
FIG. 11
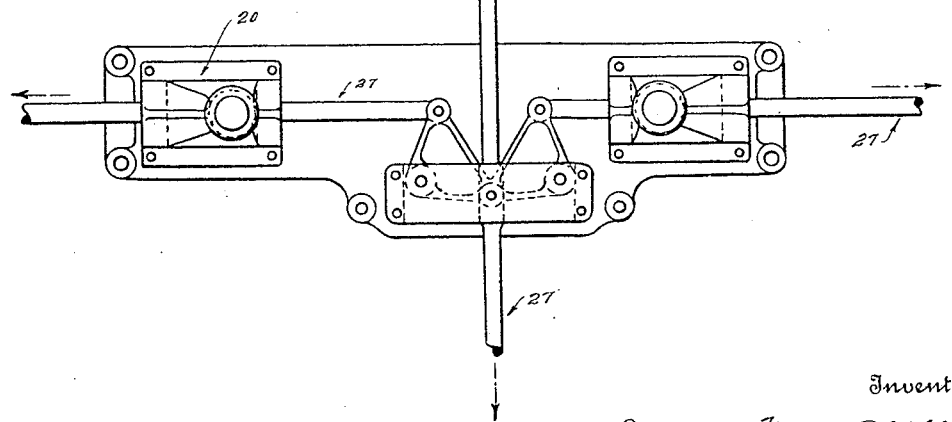
Witnesses
Joseph Paul Burg
N. P. Connor
Inventor
Isadore Francis Pfeiffer I. F. PFEIFFER.
SCALE.
APPLICATION FILED MAY 19, 1913.
1,210,689.
Patented Jan. 2, 1917
6 SHEETS—SHEET 5.
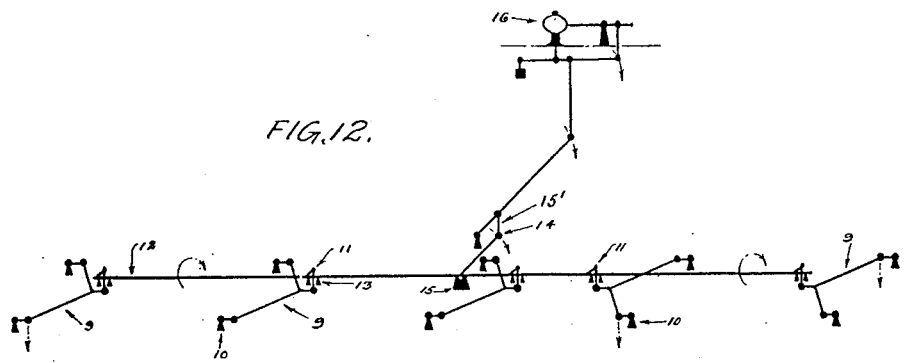
FIG. 12.
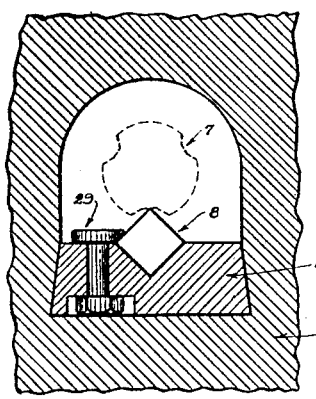
FIG. 14.
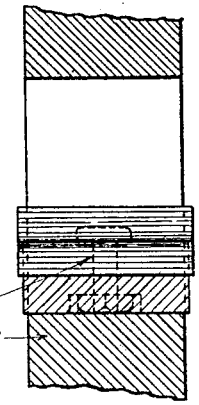
FIG. 14.ª
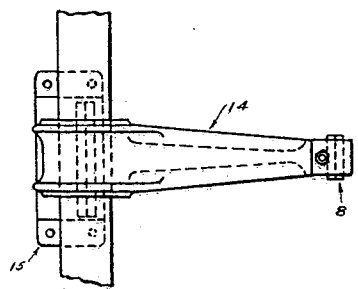
FIG. 20
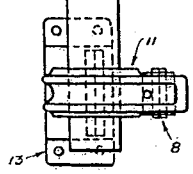
FIG. 21.
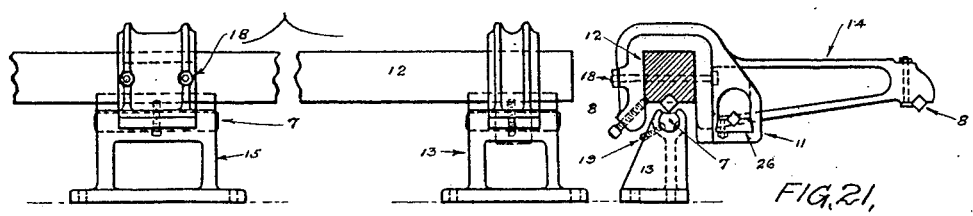
FIG. 13.
Inventor
Isadore Francis Pfeiffer
Witnesses
Joseph Paul Burg
A. R. Connor

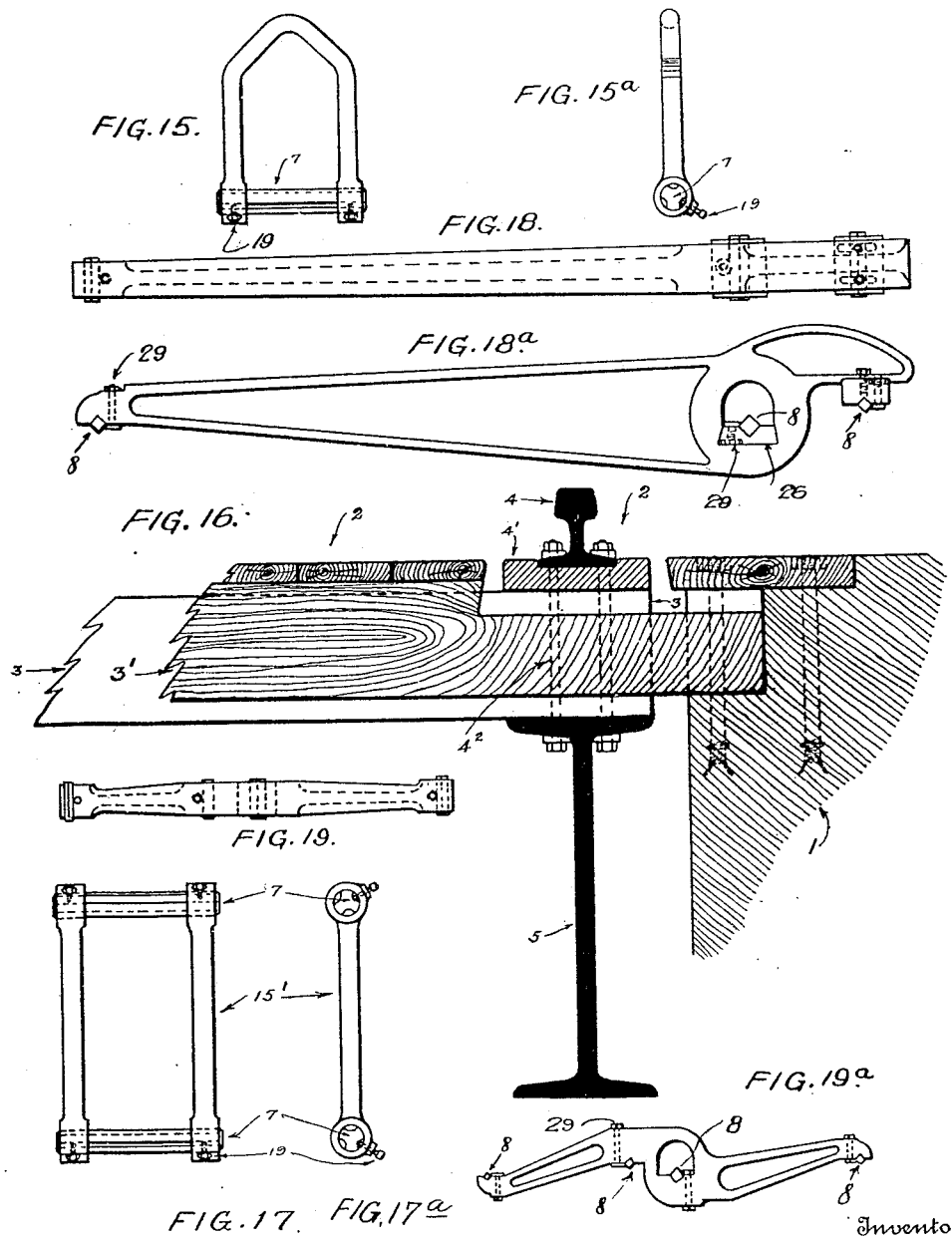

UNITED STATES PATENT OFFICE.

ISADORE FRANCIS PFEIFFER, OF ALTOONA, PENNSYLVANIA.

SCALE.

1,210,689.　　　　　　Specification of Letters Patent.　　　Patented Jan. 2, 1917.

Application filed May 19, 1913. Serial No. 768,510.

*To all whom it may concern:*

Be it known that I, ISADORE FRANCIS PFEIFFER, a citizen of the United States, residing at Altoona, in the county of Blair and State of Pennsylvania, have invented certain new and useful Improvements in Scales, of which the following is a specification, reference being had to the accompanying drawing.

This invention relates to scales and more in particular to platform and rail-road scales, or scales of a similar character which are adapted to weigh comparatively large and heavy loads.

Some of the objects of this invention are: To provide a scales of the nature referred to capable of accurately weighing comparatively large loads. To provide means in the scales for adjusting each operating part without affecting the working characteristics of the other parts. To provide means whereby the wearing parts of the scales may be removed to provide other wearing surfaces that may be used when the original surfaces have become worn or damaged, thereby increasing the life of scales many times longer. To have the scales so arranged that its wearing members will be of uniform size and construction, so as to be interchangeable. To eliminate large levers and heavy castings in the scales. To have a scales so arranged that its length may be increased an extraordinary amount should it be desired to do so, without materially affecting the original scales in its action or accuracy. To design a scales having uniform and interchangeable levers. To provide a scales of comparatively light and shallow construction, yet efficient in action. To arrange the scales so that the swinging movement of the platform on its knife edges will be in the direction of movement of the vehicles, railroad cars, etc., which are weighed, thus giving an effective floating. To provide a scales which will not require continuous or exceptionally long beams to be used for the platform structure, particularly in the larger sizes of scales. To have the top or platform free from obstructions. To provide short and rigid construction between rail and I beam. To prevent rail creeping. To eliminate rail columns, and to provide a rail support that will hold securely the rail ties and I beam together. To provide simple means whereby the top of the scale platform is covered and so that a weight placed on this cover has no effect on the working of scale. To provide an arrangement whereby the scale acts only when load is applied to the rails. To provide scales whereby all movement of levers up to and including "shelf lever" will be downward, thereby eliminating the upward thrust of "5th lever" as commonly used in present track scales. To provide a "shelf lever" that in addition to having interchangeable steels, has also means by which the lever system may be brought into state of equilibrium. To provide a "5th lever" that in addition to having interchangeable steels has also a movable block fastened to "short end" of lever. This design enables "count" of lever to be changed with very little movement of block, as compared with levers that have movable block at long end. To provide scales whose levers when connected are always "pulling" or hanging "plumb". To provide a platform scales whose levers will act from the platform floor when the latter is loaded. In addition to these many other objects will become apparent, as this invention is more fully set forth.

The scales referred to in these specifications, where it is shown in the form intended for weighing loaded railroad cars, differ from the usual type of scales used for the same purposes for which they are intended in that a torsion bar which is acted upon by a suitable number of similar arms or branch levers spaced along it, is used instead of a complicated system of levers acting and interacting on one another. This feature eliminates the enormous castings so essential at present for railroad scales, and those intended for heavy loads, and enables the scales to be manufactured and erected at a comparatively low cost. The limits of length of the present railroad scales of the four section type which are considered the better are in the neighborhood of fifty feet, and its accuracy becomes questionable and difficult to properly provide for in such length, whereas, this invention permits scales built on its principles to be lengthened to a hundred or even several hundred feet, and still accurately weigh the loads placed upon it. At the same time it will not be necessary to increase the depth of the scales pit which could not be avoided in other classes of scales if they were lengthened appreciably. The lever system of the present types of scales is defective mechanically and practically in that the moments will not be set in the erected scales as they were intended to be, and the adjustment that is made to overcome the defects that arise when the scales is in place gives an empirical accuracy which is far from satisfactory. This invention permits each part to be adjusted independently of the others and in such a manner as not to impair the system or the proper alinement and action of any other part of the scales.

Figure 4:
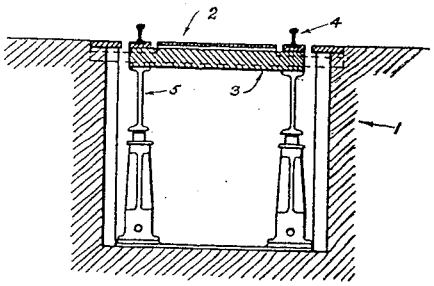
Figures 5, 5A:
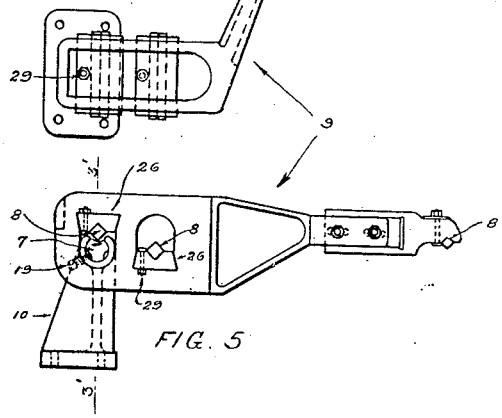
Figure 5B:
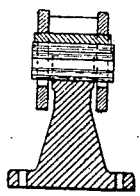

Referring now to the drawings which show an embodiment of this invention as applied to a scales for weighing railroad cars:—Figure 1 is a longitudinal elevation of a scales embodying this invention. Fig. 2 is a plan view of Fig. 1, with platform removed. Fig. 3 is an end view of Fig. 1, with toggle or lifting stands removed. Fig. 4 is a sectional view of Fig. 2 with main or branch levers removed showing toggle or lifting device stands in position. Fig. 5 is a detail of a branch lever and its supporting bearing member. Fig. 5ª is a detail in plan of branch lever and its supporting bearing. Fig. 5ᵇ is a section through 3′ of branch lever and bearing. Figs. 6 and 6ª show a detail of the leveling block and platform yoke used for actuating the branch lever. Figs. 7 and 7ª show a detail of yoke pin with links and supporting steel. Figs. 8 and 8ª show a detail of supporting steel. Figs. 9 and 9ª show a detail of a junction block used to connect the I beams of the scale structure together when same are not continuous longitudinally. Fig. 10 is a detail in elevation of the platform raising device. Fig. 11 is a plan view of platform raising device. Fig. 12 is an isometric diagram indicating the relative movements of the mechanism of the scales. Fig. 13 is a detail of the torsion bar with long torsion lever and one of the short torsion levers used in this scales with bearings for supporting it. Figs. 14 and 14ª show a section representing a method employed in levers to hold the steels in place and to give them (steels) their interchangeability. Figs. 15 and 15ª show a detail of the loop used in these scales. Fig. 16 is a sectional view showing a method of constructing top of scale platform. Figs. 17 and 17ª show a detail of a preferred link bearing used in these scales for connecting the 5th lever and torsion bar lever. Figs. 18 and 18ª show a detail of "5th lever" with movable block at short end; both ends of this lever also show a method used on the levers for holding the steels when method shown by Fig. 14 is not used. Figs. 19 and 19ª show a detail of "shelf lever." Fig. 20 is a plan detail of the torsion bar. Fig. 21 is a sectional elevation of Fig. 20.

Similar reference characters refer to similar parts throughout the drawings.

In the construction shown 1 represents the ground about a scale pit provided for the scales referred to, and 2 is the platform proper of the scales on which the ties or sleepers 3 and rails 4 of the tracks for guiding the railroad cars on the scales are mounted. The supporting structure for the platform consists mainly of I beams 5, which run longitudinally across the scales, and are suitably secured to the platform.

A suitable number of legs or yokes 6 are fastened to the under side of the I beams, and are provided through yoke pin 17 and links 17′ with steels 7, which are removably and suitably placed in the same, so that they may be removed or rotated as the conditions require. These steels press downwardly on knife edges 8, provided in branch levers 9 which are fulcrumed on the steels and bearings 10 which support them, as is shown in the drawings. It will be noted in Fig. 12, that the fulcrums of the branch levers are adjacent on the ends and that the legs press more centrally and that the other ends of the levers are connected through other steels 7 and knife edges 8 to short arms 11. The short arms 11 are suitably mounted on a torsion bar 12 so that the movement given to the former will be given to the latter, that it will rotate on its bearings 13, or given a quasi-torsional stress.

The movement of the bar will cause an operating lever 14 to move on its fulcrum which also has steels 7 and knife edges 8, and is supported by a suitable bearing member 15. The lever 14 through its connecting links 15′, operates the indicator 16, so that the load on the scales may be readily read off.

The legs 6 are preferably bifurcated and in order that they may be positively kept on the branch levers they are provided with the pins 17 which transversely lock the bifurcations together. Bolts 18 and set screws are provided for securing the branch levers to the torsion bar 12, and set screws 19 serve to retain the steels 7 in place against rotary movement.

The bearing steels 7 are preferably slotted in three peripheral places for the knife edges to engage in so that a new surface may be presented to the knife edges when the others are worn, by simply rotating the steels, which may be quickly done.

In order to raise the platform off of the lever system, a number of toggle jacks are provided which consist of a frame 20, a head 21, a link 22, and a sliding element 23. A rod 27 suitably actuated by a lever or motor pulls the element 23, so that the links will be brought vertically under the heads 21, and force the latter up and thereby raise the platform. The elements 23 are preferably supported with roller bearings 25 to reduce their frictional resistance.

In order to have interchangeability of knife edges a block of metal 26 is either fitted or cast in lever 28 (section of lever Fig. 14) after fitting or molding the block 26 is removed from lever 28, machined and fitted out so that steel 8 will be located properly, steel 8 is then held securely in place by bolt 29, although other means may be used for the purpose.

In constructing the platform of the scale means are provided as shown in Fig. 16 which consist of tie 3 which extends across scale and rests on I beam 5 rail 4 fits and is bolted on rail supporter 4' through tie 3 to I beam 5. The rail support is made of metal and runs continuously (in sections if necessary) the full length of scale 3' is a false tie which is supported at each end in pockets made in side of scale pit, and which ties are placed between ties 3 and midway between rail support 4' and I beam 5. These ties 3' are for supporting the light flooring across scale.

In Fig. 8 is seen a preferred form of bearing surfaces for knife edges. In this type the bearing surface is flat and outwardly and upwardly beveled so as to permit the knife edge to freely oscillate. This form of construction is much to be preferred to the usual convexed types of bearing surfaces used for similar purposes in the mechanical arts and especially for scales.

The general construction of the scales shown in the modification in the case may indicate that the beam should be separated where the pit is kept is shallow as possible in order to permit the 5th-beam to project to the sides in the manner shown. There are, however, several ways in which the separating of the beams could be avoided, and the first method is to cut a slot or hole in the beam, while the second method is to place the 5th-beams on the end of the shaft or torsion bar, as it is technically referred to in this specification, and it is intended that this application cover these forms of construction without more specifically referring thereto.

A special feature that should be noted is the arrangement of making fulcrum and the adjustment on the 5th-beam on the short arm, which eliminates many of the defects in the present type of scales, one in particular being that of tending to raise the bearing member that supports it on its foundation. It is further understood that the 5th-beam may be kept entirely out of the pit should such an arrangement be permissible. This would be done by using any suitable means for transmitting the movements of the torsion bar to the 5th-beam from where it is placed.

In order to provide a more positive and careful means to be used as knife edges than is at present used, a knife edge of the square cross-section, see Figs. 9 and 19 is used; and as before referred to, the bearing pieces for the same are grooved bars, arranged with a plurality of the necessary surfaces for them to rest on. The first arrangement is a valuable part of this invention as it enables such a knife edge to be readily ordered from stock, and accuracy in their cross-section is not essential, if their sides are at right-angles, because the vertical position of the edge will always be the same, which thereby does not affect the moment of the lever. Either the four sides may be used for knife edges. To better illustrate this arrangement, it may be said that if the proper size of the knife edge is an inch square, and one and a sixteenth of an inch is the size of the only bar available, or one that is fifteen-sixteenths of an inch, they will not appreciably affect the accuracy. The method of arranging the castings for the bars that must be removed for machining and which is a unique development of this invention consists in the placing of the support for knife edges, journal bars, lock, etc., in the casting when it is cast, putting if necessary a lamp black covering on the same so that when the casting is made the metal member that has been so placed in, may be readily knocked out. The results of this method are productive of a casting that is specially suitable for this invention herein described particularly as most of the specially machining of the same is avoided, and the danger of breaking the casting is eliminated during movement.

As may be seen in Fig. 13, side elevation, the knife edge is inserted in a V-shaped groove in the block 12, which block is held in place by means of bolts 18 and set screws 26. The knife edge is readily removable and is shown with no additional means for keeping it in position. The pressure between the block and the part 7 together with the sides of the V groove serve to keep the knife edge in place, and will prevent the knife edge from coming out in operation although it may be readily removed at other times.

In this scale it will be noted that the wearing of the pins does not materially affect the accuracy of the same.

In order to eliminate another great defect in the present types of scales an improved form of shelf lever is provided which eliminates the trouble and incidentally any inaccuracy which occurs with the general kind that are adjustable adjacent to the scale bar. The platform described and shown in this application is not only simple but eliminates the special clamping arrangement now in use, as well as the special rail chair or rail beams, that separates the rails its entire length, and which has been considered a necessary evil due to its tendency to crack and permit creeping.

It will be seen that the platform arrangement of the scales is such that the whole platform will move in the direction in which the load is moving and in such a manner as to be distributed by the levers thereon, that is, not the several main levers floated but all.

Definition of the term, non-floating: Non-floating in its reference to levers in this application, designates a lever which has a definitely disposed fulcrum point and support for the same, neither of which change appreciably in relation to one another or position, in their normal leverage action. It is an arrangement which permits a lever to rotate in a normal and simple manner on a stationary fulcrum point and support for same, but not swing or oscillate therewith. It particularly differs from those classes of levers which have links or other flexible swinging or floating means in use, for the support of their fulcrums.

It will be noted that the branch levers are mounted in pairs so that two connect with one short arm, and the branch levers are right and left according to the position they are in. This is in order to permit a great amount of adjustment to be made and to give a more even distribution of the weight to the branch levers.

While but one form of the construction is shown in the drawings it is not intended to limit this application for patent to that particular form, or in any other way otherwise than limited by the prior art, as many modifications in the construction of this invention may be made without departing from the principles thereof.

Having thus described the invention what is claimed is:—

1. A railroad scales comprising in combination, a platform, a plurality of equal non-floating levers for supporting the platform, a polygonal lever, means for rotating the polygonal lever by the first mentioned levers, knife-edges arranged to recess in one of the edges of the lever and support the same, and means for supporting the knife-edges.

2. A railroad scales comprising in combination, a platform, a plurality of beams supporting the platform, non-floating levers supporting the beams, flexible members acted upon by said levers, a bar torsionally acted upon by said members, means for indicating loads actuated by said bar, and knife-edge means for supporting the bar and permitting the same to turn about its longitudinal axis.

3. A railroad scales comprising in combination, a platform, a plurality of beams supporting the platform, non-floating levers supporting the beams, flexible members acted upon by said levers, a bar torsionally acted upon by said members, means for indicating loads actuated by said bar, removable knife-edge means for supporting the bar and permitting the same to turn about its longitudinal axis, and means for securing said flexible members to the bar.

4. A scales comprising in combination, a platform, a plurality of beams supporting the platform, non-floating levers supporting the beams, means for indicating the loads on the platform actuated by the levers, blocks in the levers, knife-edges set in the blocks, and journal means for the knife-edges to engage in and be supported thereby.

5. A scales comprising in combination, a platform, a plurality of beams running under the platform and supporting the same, yokes mounted in the beams, levers, links flexibly connecting the yokes and levers together, said links, yokes and levers being arranged to move in a direction away from the platform when the platform is supporting a weight, a single weighing lever acted upon by said levers, means for supporting the beams independently of the levers, and journal members for said levers, links and yokes adapted to present a plurality of changeable bearing surfaces.

6. A scales comprising in combination, a platform, a plurality of beams running under the platform and supporting the same, yokes mounted in the beams, levers, links flexibly connecting the yokes and levers together, said links, yokes and levers being arranged to move in a direction away from the platform when the platform is supporting a weight, a single weighing lever acted upon by said levers, means for coupling the beams and spacing them, and toggle mechanism for raising the beams and platform.

7. A scales comprising in combination, a platform, a plurality of girder sections supporting the platform, yokes on the sections, levers between the yokes, links for transmitting weight from the yokes to the levers, removable means for holding the links in place, fulcrum members for the levers, means for supporting the members, knife-edges for bearingly connecting the members and last mentioned means together, means for adjusting the length of levers, a single bar acted upon directly by all of the aforementioned levers, a weighing lever connected to the bar, and means for supporting the lever.

8. A scales comprising in combination, a platform, a plurality of girder sections supporting the platform, yokes on the sections, levers between the yokes, links for transmitting weight from the yokes to the levers, removable means for holding the links in place, fulcrum members for the levers, means for supporting the members, a knife-edge, means coacting between said knife-edge and members, means for adjusting the length of levers, a single bar acted upon directly by all of the aforementioned levers, a weighing lever supporting the bar, means for supporting the lever, and means having a plurality of bearing surfaces for the yokes and levers.

9. In a scales, means for providing a plurality of wearing surfaces at the journals in a single bearing member, a weighing lever having one of the bearing members forming the journals, and means for adjusting the effective length of the weighing lever at its short end.

10. In a scales, means for providing a plurality of wearing surfaces at the journals in a single bearing member and means for adjusting the effective length of the weighing lever at its short end and means for locking the means having the plurality of wearing surfaces in place.

11. A scales comprising in combination, weighing levers having wedge-like clearance holes therein for bearing purposes, blocks positioned in said holes, knife-edges in said blocks, and bearing means for the knife-edges, a platform, and apexed U shaped links connecting the platform and bearing means, whereby the links will be kept centered and chance for error reduced.

12. A scales comprising in combination, weighing levers having clearance holes therein for bearing purposes, separable blocks positioned in said holes, knife-edges set in said blocks for bearing means for the knife-edges, grooved members for the knife-edges to rest in, means for retaining the members positioned, and means for securing the knife-edges to the blocks.

13. A scale comprising in combination, weighing levers having box-like butt portions having wedge like clearance holes therein, blocks self-holding in the holes, knife-edges of polygonal cross-section in the blocks, means for holding the knife-edges in the blocks, a main lever acted upon by said weighing levers, self-centering links for flexibly connecting the lever and weighing levers together, means for supporting the knife-edges and levers, and scale indicating means connected with the main lever.

14. A scales comprising in combination, a platform, non-floating weighing levers supporting the platform, means for adjusting the length of levers, a torsion bar actuated by the levers, a fifth-lever actuated by the bar, indicating means acted upon by the fifth-lever, supports for the levers and bar, and interchangeable members having a plurality of bearing surfaces for connecting the levers, bar and supports together.

15. A scales comprising in combination, a platform, means supporting the platform, yokes connected to the platform, links on the yokes, levers connected by the links to the yokes, means for fulcruming the levers adjacent one end thereof, links connected to the levers in addition to the aforesaid links, a torsion mechanism actuated by the last mentioned links, weighing mechanism operated by the aforesaid mechanism, interchangeable bearing members having a plurality of bearing surfaces and edges for the levers, yokes and links, and means for retaining the members in the same arranged to fit properly without requiring machine work.

16. A scales comprising in combination, a platform, means supporting the platform, yokes connected to the means, links on the yokes, levers connected by the links to the yokes, means for fulcruming the levers adjacent one end thereof, links connected to the levers in addition to the aforesaid links, a torsion mechanism actuated by the last mentioned links, a weighing shelf-lever operated by said mechanism and weighing means operated by the shelf lever.

17. A scales comprising in combination, a platform, means supporting the platform, yokes connected to the means, links on the yokes, levers connected by the links to the yokes, means for fulcruming the levers adjacent one end thereof, links connected to the levers in addition to the aforesaid links, a torsion mechanism actuated by the last mentioned links, a shelf-lever provided with a plurality of arms, operated by said mechanism, weighing means operated by the shelf-lever and connected to the arms thereof, and adjustable weighing means for the shelf-lever for adjusting the balance of the scales.

18. A scales comprising in combination, a platform, a plurality of beams supporting the platform, means joining the beams together, non-floating symmetrical levers oscillatably supporting the beams, a common member acted upon by said levers, a fifth-lever secured to the member, another lever acted upon by the last mentioned lever and indicating means actuated by this lever, stops for limiting the downward movement of the beams, and means for raising the stops simultaneously.

19. A scales comprising in combination, a platform, leveling blocks on the platform, yokes engaged to the blocks, yoke-pins in the yokes, weighing levers, links flexibly connecting said levers and pins together, a torsion bar having grooves therein, knife-edges set directly in the grooves, arms projecting from the torsion bar, links connecting the arms and levers together, means for indicating the load on the platform actuated by the torsion bar, and rigid means for supporting the levers and knife-edges.

20. A railroad scales comprising in combination, a platform, a plurality of separated beam-construction units supporting and framing the platform, yokes on the beam-construction units, weighing levers actuated by the yokes, apexed links centrally connecting the levers and yokes, a torsion bar actuated by the levers, said bar having grooves at desirable journal locations, knife-edges of polygonal cross-section in the grooves, recessed bars adapted to support the knife-edges, supports for the bars, a main weighing lever operated by the torsion bar disposed between the units and actuatable therebetween, a shelf lever operated by the main lever, and indicating and controlling mechanism actuated by the shelf lever.

21. A railroad scales comprising in combination, a platform, a plurality of beam-construction units supporting and framing the platform, yokes on the beam-construction units, weighing levers actuated by the yokes, apexed links connecting the levers and yokes, a torsion bar actuated by the levers, said bar having grooves at desirable journal locations, knife-edges of equilateral cross section engaging in the grooves, recessed bars adapted to support the knife-edges, means for supporting and securing the bars, a main weighing lever operated by the torsion bar disposed between the units and actuatable therebetween, a shelf-lever operated by the main lever, indicating mechanism operated by the shelf-lever, means for adjusting the shelf-lever and means for adjusting the moment lengths of the main lever at its short end.

22. A scales comprising in combination, a platform, leveling blocks on the platform, yokes engaged to the blocks, yoke-pins in the yokes, weighing levers, links flexibly connecting said levers and pins together, a torsion bar having grooves therein, knife-edges set directly in the grooves, arms projecting from the torsion bar, links connecting the arms and levers together, means for indicating the load on the platform actuated by the torsion bar, rigid means for supporting the levers and knife-edges, and a toggle jack means for raising the platform and taking the weight thereof.

In testimony whereof I hereunto affix my signature in the presence of two witnesses.

ISADORE FRANCIS PFEIFFER.

Witnesses:
  A. P. CONNOR,
  JOSEPH PAUL BURG.

Copies of this patent may be obtained for five cents each, by addressing the "Commissioner of Patents, Washington, D. C."